E. A. WALL.
ORE CRUSHER.
APPLICATION FILED JUNE 13, 1912.

1,044,832.

Patented Nov. 19, 1912.
2 SHEETS—SHEET 1.

WITNESSES

INVENTOR
E. A. Wall
by Attorney

E. A. WALL.
ORE CRUSHER.
APPLICATION FILED JUNE 13, 1912.

1,044,832.

Patented Nov. 19, 1912.

2 SHEETS—SHEET 2.

WITNESSES

INVENTOR
E. A. Wall
Attorney

UNITED STATES PATENT OFFICE.

ENOS A. WALL, OF SALT LAKE CITY, UTAH.

ORE-CRUSHER.

1,044,832.  Specification of Letters Patent.  Patented Nov. 19, 1912.

Application filed June 13, 1912. Serial No. 703,510.

*To all whom it may concern:*

Be it known that I, ENOS A. WALL, a citizen of the United States, residing at Salt Lake City, in the county of Salt Lake and State of Utah, have invented certain new and useful Improvements in Ore-Crushers, of which the following is a specification.

My invention relates to ore crushers in which the rolls are ribbed instead of plain.

The object of the invention is to produce an ore crusher of the ribbed type in which there shall be a maximum output of granular product with the minimum amount of slimes. Also to produce an ore crusher in which the output will not only be greater and more perfect than with the usual plain faced or "Cornish" rolls, but in which the life of the rolls will be greatly increased.

A further object is to obviate the use of separate drive pulleys and duplicate reversely arranged finger-gears as in my prior Patent 988,749, April 4, 1911. In this patented machine the drive pulleys were each about six feet in diameter and were driven at about 150 revolutions per minute, so that where one pulley was even slightly larger or smaller than the other the difference in the travel of the belts resulted in imparting different speeds to the two rolls, amounting to several inches per minute, thus causing increased strain on the controller gears which could only be relieved by the slipping of one or the other of the belts. Such slipping of a belt of the size and strength required was, however, impossible where the pulleys were of slightly different diameters, for the power required in causing the slipping of the belt was found to be greater than the power necessary for driving the rolls, and so such a strain was thrown upon the controller gears as to result in the excessive wear and frequent breaking of their teeth, thus rendering the machine inoperative under these conditions. I found, therefore, that by dividing the rolls into sections, with the ribs of one section registering with the grooves of the other section, the necessity for a double belt drive and a double controller gear was obviated and a perfectly operating machine would follow by the use of a single drive pulley and one pair of driving gears connecting the rolls having their ribs arranged as described.

Figure 1:
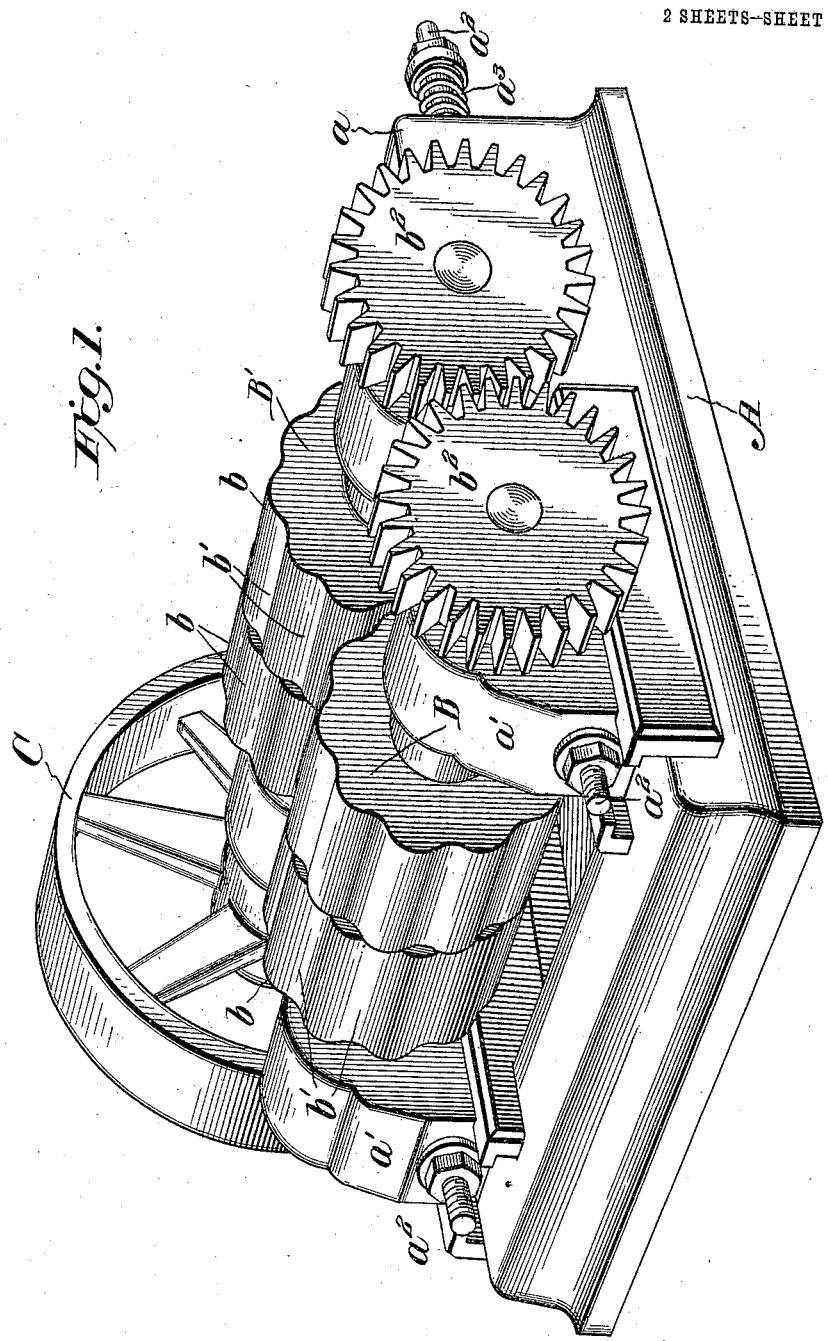
Figure 2:
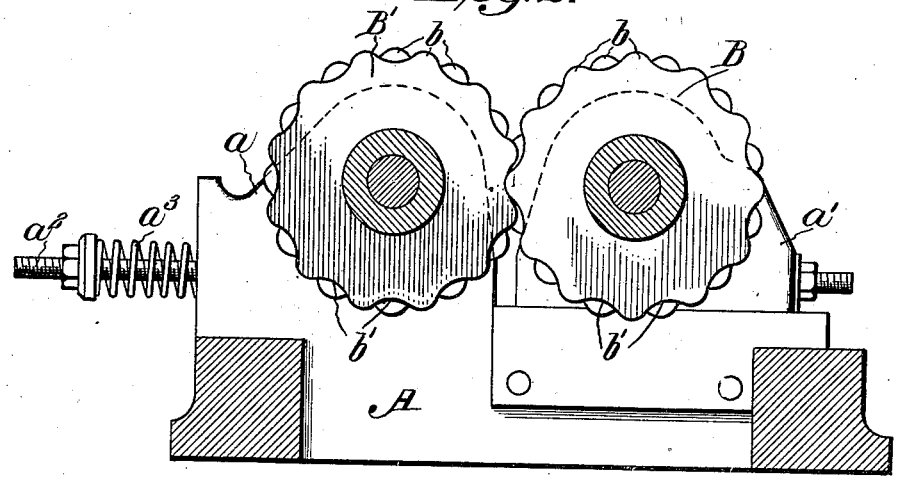
Figure 3:
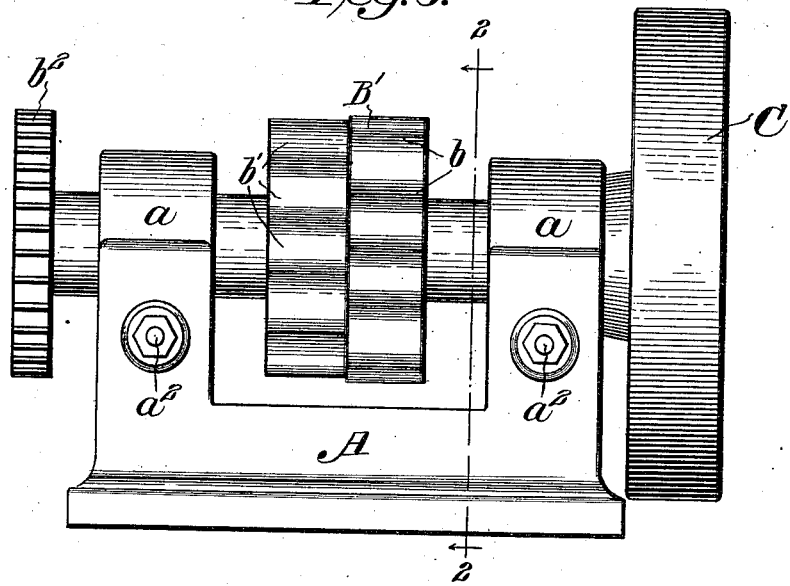

Figure 1 is a perspective showing my improved ore crusher. Fig. 2 is a sectional side elevation on line 2—2, Fig. 3. Fig. 3 is an end elevation.

A designates the frame or bed having fixed bearings $a$, $a$, sliding bearings $a'$, $a'$, and rods $a^2$, $a^2$ extending from the sliding bearings and provided at their opposite ends with tension springs $a^3$, $a^3$ to draw the sliding bearings toward the fixed bearings. This construction is that commonly employed in the class of ore crushers employing parallel crushing rolls.

B, B' are the crushing rolls provided with longitudinally extending ribs $b$. The ribbed surface of each roll is divided at the middle of the roll so that the ribs of one-half of the roll register at their inner ends with the grooves $b'$ of the other half of the roll and extend in longitudinal alinement therewith. The ribs $b$ of one roll register with the grooves $b'$ of the other roll. The ends of the roll shafts are provided with long-toothed drive gears $b^2$, $b^2$, which mesh with each other. The opposite end of one roll shaft is provided with a large heavy drive pulley C for rotating the rolls at a high peripheral velocity.

By reason of gearing the roll shafts together, the one is positively driven from the other and the long-toothed gears permit the necessary relative yielding movement of the rolls and also allow of the relative approach of the rolls due to the wearing down of the ribs thereof. Moreover, the staggered relation of the ribs above described tends to prevent all back-lash, as any tendency of the ribs at one end of the rolls to reverse is overcome by the ribs at the other end. Thus it will be seen that the crushing thrust of the driving roll impinges at all times upon opposite sides of the corrugations at opposite ends of the roll sections. Since the ribs of one roll do not contact with those of the other, refractory slimes will be avoided and a granular product will result. This will be better understood, possibly, by the action of a roll traveling on a flat surface. Where such a roll continuously rotates in its travel it will crush broken ore into granular form, but should it partly slide and not turn continuously then the ore will be given a smearing action and its granular form will be destroyed and a refractory slime will result. To avoid such slimes has been the object long sought for. This object was accomplished in my prior construction, patented

April 4, 1911, No. 988,749, but there each roll had its own large drive pulley, and two sets of reversely acting finger-gears were necessary, so that the present construction greatly simplifies that of the patent referred to. I am aware that a three-ribbed roll has been formed in two sections, the three ribs at one end registering with the three grooves at the other end of the roll, but in such prior rolls one roll was not geared positively to the other so that a rubbing, slime-producing action followed and not a perfect crushing or granular-producing action. The output would thus be imperfect and necessarily very limited. In other words, the ribs are so arranged in my present mill and the rolls so operated that there is no sliding action by the ribs of one roll upon the ribs of the other, since back-lash and inequality of rotation of the rolls are prevented by the staggered arrangement of the ribs and the positive gearing of the two rolls together. The life of the rolls, due to the even wear thereof resulting from the present construction, is also greatly lengthened.

In action the rolls are driven at high speed and the ore may be delivered direct from the bins, without sizing, up to eight-inch cubes. These larger pieces, owing to the high peripheral speed of the rolls, are simply hammered into fragments by the ribs before reaching the nipping or crushing point of the rolls.

What I claim is:

1. An ore crusher comprising a pair of ribbed rolls, the ribs of each roll being divided, and those at one end of the roll registering with the grooves of the other end, long-toothed meshing gears on the roll shafts, and a drive pulley on one roll shaft, for the purpose set forth.

2. An ore crusher comprising a pair of rolls, each having longitudinally extending ribs; the ribs of each roll being divided at the middle of the roll into two series with the ribs of one series registering with the grooves of the other series, long-toothed meshing gears on the roll shafts, and a large pulley for rotating the rolls at a high peripheral speed.

In testimony whereof I affix my signature in presence of two witnesses.

ENOS A. WALL.

Witnesses:
 GEO. H. EVANS,
 CARL REDMAN.

---

Copies of this patent may be obtained for five cents each, by addressing the "Commissioner of Patents. Washington, D. C."